Patented Oct. 3, 1922.

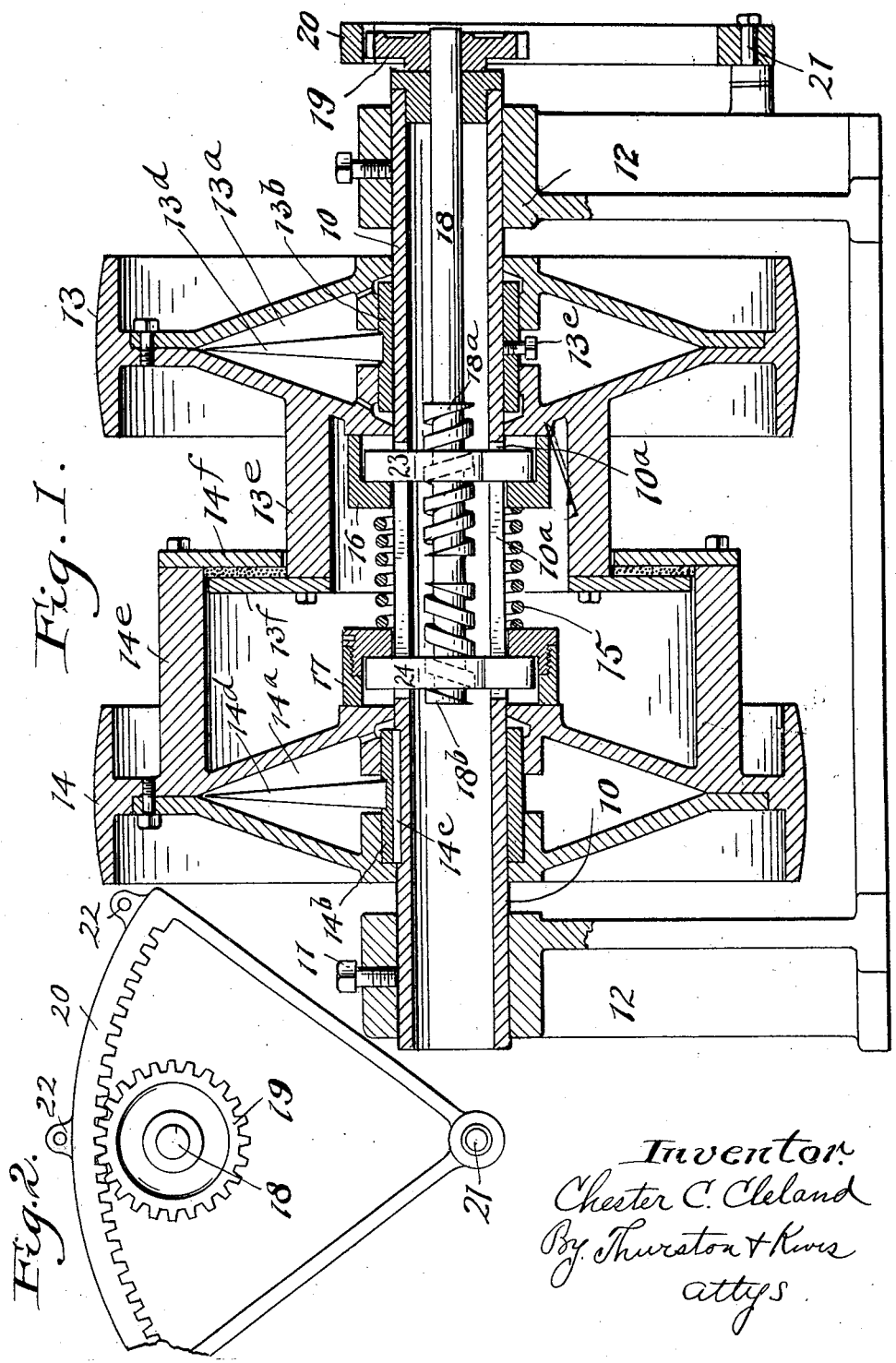

1,430,627

UNITED STATES PATENT OFFICE.

CHESTER C. CLELAND, OF CLEVELAND, OHIO.

POWER-TRANSMITTING UNIT.

Application filed June 5, 1918. Serial No. 238,268.

*To all whom it may concern:*

Be it known that I, CHESTER C. CLELAND, a citizen of the United States, residing at Cleveland, in the county of Cuyahoga and State of Ohio, have invented a certain new and useful Improvement in Power-Transmitting Units, of which the following is a full, clear, and exact description.

This invention relates to a power transmitting unit and has for its chief object to provide a unit which will perform all the functions of and replace the ordinary power transmitting unit including the constantly running countershaft, tight and loose pulleys thereon, and clutch by which the normally loose pulley may be unclutched from or clutched to the counter shaft so as to transmit power from the tight or driven pulley and countershaft to the special machine or tool to be driven.

Further the invention aims to provide a power transmitting unit which can be mounted in any desired position, which is simpler, safer, consumes less power, and occasions less lubricating trouble than the ordinary unit above referred to.

The unit constituting the subject matter of my invention includes a stationary shaft, two power transmitting elements thereon in the form of pulleys of gears, one being the driving element running on the stationary shaft, and the other the element to be driven thereby together with clutch members by which the two elements can be clutched together and unclutched by clutch operating mechanism preferably extending through the stationary hollow shaft.

The invention may be further briefly summarized as consisting in certain novel details of construction and combinations and arrangements of parts which will be described in the specification and set forth in the appended claims.

In the accompanying sheet of drawings, Fig. 1 is a longitudinal sectional view through a power transmitting unit embodying my invention in one of its forms, and showing pulleys as the power transmitting elements; Fig. 2 is a detail end view of the clutch operating mechanism in one of its forms.

Referring now to the drawings, it will be seen that the unit includes a stationary hollow shaft 10, which is fixed by set screws 11 or equivalent means in brackets 12 which may be separate from each other or united or made integral with a base and which may be mounted in any desired position with reference to the supporting wall or other supporting device so as to project downwardly, upwardly, or laterally at any desired or necessary angle.

Mounted to rotate on this shaft are two power transmitting elements 13 and 14 which are here shown in the form of pulleys, but which may consist of gears. The element 13 is in this case the driving element, and may run continuously on the stationary shaft, and the element 14 is the driven element normally stationary on the shaft, but designed to be clutched to or unclutched from the element 13.

As here shown the elements 13 and 14 are self-lubricating, being provided with hollow oil chambers 13$^a$ and 14$^a$, and rotating on bushings 13$^b$ and 14$^b$. The bushing 13$^b$ is fixed by a set screw 13$^c$ to the hollow stationary shaft 10, and the bushing 14$^b$ is held by a key 14$^c$ against rotation on the shaft but is slidable slightly endwise thereof.

While these pulleys are rotating, oil will be thrown outwardly toward the outer peripheries of the chambers 13$^a$ and 14$^a$, and some will run down fixed upstanding pins 13$^d$ and 14$^d$ to lubricate the bearing surfaces. Other means of lubricating may be used, however, and other forms of bearings may be utilized, such as ball or roller bearings.

The two power transmitting elements 13 and 14 are provided with laterally extending flanges 13$^e$ and 14$^e$, which are provided with overlapping friction clutch plates 13$^f$ and 14$^f$, which are faced with suitable friction or clutch material. Instead of using flat parallel clutch faces the clutch members may be in the form of male and female cone clutch members.

Surrounding the shaft is a coil spring 15 which engages two cup-shaped members 16 and 17 which likewise surround the shaft and are adapted to engage respectively the hubs of the two pulleys or power transmitting elements 13 and 14, these cup-shaped members being beneath the laterally projecting clutch flanges 13$^e$ and 14$^e$. The cup-shaped members 16 and 17 are not attached to the power transmitting elements 13 and 14. When the spring 15 is free to spread the two members 16 and 17, the power transmitting element 14 will be moved slightly along the shaft 10 and the clutch members 13$^f$ and 14$^f$ will be brought into clutching engagement, whereupon the element 14 will be driven by the element 13, in which event the two elements with the co-operating clutch members rotate as a unit.

Suitable means is provided to move the members 16 and 17 toward each other and thus compress the spring so that the element 14 will be released from the element 13. As here shown, this means includes a rod 18 which extends inwardly from one end of the hollow shaft 10, and which may be turned by any suitable means exteriorly of the shaft to throw the clutch in or out, this turning means in this case consisting of a pinion 19 on the projecting end of the rod 18 and a segment 20 pivoted at 21 on one of the standards 12 and provided with internal teeth which engage the pinion. The segment is provided on its outer periphery with a plurality of perforated lugs 22, to any one of which a clutch operating device such as a rod may be connected.

This rod 18 has right and left hand screw threads 18$^a$ and 18$^b$, which are engaged respectively by two elongated nuts 23 and 24, the ends of which project through slots 10$^a$ of the shaft 10 into the cup-shaped members 16 and 17, as shown in Fig. 1.

It will be seen that when the rod is turned in one direction the nuts 23 and 24 move apart or away from each other so as to permit the spring to throw in the clutch, and that when the rod is turned in the reverse direction the nuts 23 and 24 move toward each other compressing the spring and causing the cup-shaped members 16 and 17 to be moved toward each other, whereupon the clutch is thrown out or released. When the clutch is in, the cup-shaped members 16 and 17 are pressed firmly against the rotating elements 13 and 14, so that the two elements or pulleys, the spring 15, and the members 16 and 17 rotate in unison with respect to the hollow shaft, but when the clutch is thrown out the parts 15, 16 and 17 as well as the element 14 are stationary on the shaft.

While I prefer to use the clutch shifting mechanism including the rod with the right and left hand threaded portions engaged by the nuts, some equivalent clutch shifting device might be employed to release or throw the clutch in.

It will be apparent from the above that certain changes may be made in the construction shown, and I therefore do not desire to be confined to the exact details shown, but aim in my claims to cover all modifications which do not involve a departure from the spirit and scope of my invention in its broadest aspects.

Having described my invention, I claim:

1. In a power transmitting unit, a stationary shaft, a pair of power transmitting elements adapted to rotate thereon, one constituting the driving element and the other the driven element, said elements having on their adjacent faces co-operating clutch parts by which the two elements may be clutched together or released, a spring between the elements for causing clutching engagement, and means extending through said shaft for compressing the spring to break the clutching engagement.

2. In a power transmitting unit, a stationary shaft, a pair of power transmitting elements adapted to rotate thereon, one constituting the driving element and the other the element to be driven thereby, said elements having on their adjacent faces co-operating clutch parts by which the two elements may be clutched together or unclutched, one of said elements being axially movable, means between the two elements for causing clutching engagement to be made or broken and a device extending through the shaft for operating said means.

3. In a power transmitting unit, a stationary shaft, a pair of power transmitting elements adapted to rotate thereon, one constituting the driving element and the other the element to be driven thereby, one of said elements being movable axially on the shaft, a spring surrounding the shaft between the two elements for causing clutching engagement, and a pair of oppositely movable members at the ends of the spring for compressing the spring to break the clutching engagement.

4. In a power transmitting unit, a stationary shaft, a pair of power transmitting elements adapted to rotate thereon, one constituting the driving element and the other the element to be driven thereby, one of said elements being movable axially on the shaft, a spring surrounding the shaft between the two elements for causing clutching engagement, a pair of oppositely movable members at the ends of the spring for compressing the spring to break the clutching engagement, and means extending through said shaft for shifting said members.

5. In a power transmitting unit, a hollow stationary shaft, a pair of power transmitting elements adapted to rotate thereon, one constituting the driving element and the other the element to be driven thereby, said elements having on their adjacent faces clutch parts by which the two elements may be clutched together or unclutched, one of said elements being movable axially on the shaft, means for operating the clutch comprising a spring surrounding the shaft, a pair of oppositely movable members between the ends of the spring and the two elements, and means extending through the shaft for shifting said members toward each other so as to compress the spring, or away from each other so that the spring may throw in the clutch.

6. In a power transmitting unit, a hollow stationary shaft, a pair of power transmitting elements adapted to rotate thereon, one constituting the driving element and the other the element to be driven thereby, said elements having on their adjacent faces clutch parts by which the two elements can be clutched together or unclutched, one of said elements being movable axially on the shaft, means for operating the clutch comprising a spring surrounding the shaft, a pair of oppositely movable members between the ends of the spring and the two elements, and means extending through the shaft for shifting said members toward each other so as to compress the spring, or away from each other so that the spring may throw in the clutch, said means comprising a rod extending through the shaft and having right and left hand threaded portions and nuts engaging said portions and projecting through the shaft into engagement with said members at the ends of the spring.

In testimony whereof, I hereunto affix my signature.

CHESTER C. CLELAND.